United States Patent [19]

Dhara

[11] Patent Number: 5,974,104
[45] Date of Patent: Oct. 26, 1999

[54] DATA FRAME SYNCHRONIZER FOR SERIAL COMMUNICATION SYSTEM

[75] Inventor: Narendra K. Dhara, San Jose, Calif.

[73] Assignee: LSI Logic Corporation, Milpitas, Calif.

[21] Appl. No.: 08/800,886

[22] Filed: Feb. 13, 1997

[51] Int. Cl.$^6$ ...................................................... H04L 7/00
[52] U.S. Cl. ........................... 375/368; 370/509; 375/372
[58] Field of Search .................................... 375/368, 365, 375/355, 359, 366, 372, 369; 370/509, 503, 510, 512, 513, 506, 505, 519; 348/526

[56] References Cited

U.S. PATENT DOCUMENTS

| 4,873,684 | 10/1989 | Kobayashi et al. | 370/506 |
| 5,287,389 | 2/1994 | Ichibangase et al. | 375/365 |
| 5,467,360 | 11/1995 | Lokhoff | 371/37.4 |
| 5,621,773 | 4/1997 | Varma et al. | 370/509 |
| 5,673,296 | 9/1997 | Ohgane | 375/368 |

OTHER PUBLICATIONS

Robert A. Scholtz, "Frame Synchroization Techniques," *IEEE Transactions On Communications*, vol. Com–28, No. 8, Aug. 1980, pp. 1204–1212.

Denis T. R. Munhoz, José Roberto B. DeMarca and Dalton S. Arantes, "One Frame Synchronization of PCM Systems," *IEEE Transactions On Communications*, vol. Com–28, No. 8, Aug. 1980, pp. 1213–1217.

David E. Dodds, Si–Ming Pan and Arthur G. Wacker, "Statistical Distribution of PCM Framing Times," *IEEE Transactions On Communications*, vol. 36. No. 11, Nov. 1988, pp. 1236–1240.

Ken Stauffer and Andy Brajkovic, "DS–1 Extended Superframe Format and Related Performance Issues," *IEEE Communications Magazine*, Apr. 1989, pp. 19–23.

David E. Dodds, Lyle R. Button and Si–Ming Pan, "Robust frame Synchronization for Noisy PCM Systems," *IEEE Transactions On Communications*, vol. Com–33, No. 5, May 1985, pp. 465–469.

*Primary Examiner*—Chi H. Pham
*Assistant Examiner*—Jean B Corrielus

[57] ABSTRACT

A data frame synchronizer identifies frame boundaries in a serial data stream formed of a set of multi-bit frames. Selected frames in the set have a frame boundary bit at a specified location within the frame, and the frame boundary bits together form a predetermined pattern. The frame synchronizer includes a memory array having a memory data input, a memory data output and a plurality of rows and columns for storing the serial data stream. A memory control circuit is coupled to the memory array for writing successive bits of the serial data stream into the memory array through the memory data input in a sequence such that all of the frame boundary bits align in one of the rows. As each bit is being written into the memory array, the memory control circuit reads the corresponding row through the data output. A pattern detector is coupled to the memory data output for comparing the row with a predetermined pattern.

19 Claims, 3 Drawing Sheets

DATA FRAME SYNCHRONIZER FOR SERIAL COMMUNICATION SYSTEM

BACKGROUND OF THE INVENTION

The present invention relates to a serial communication system and, more particularly, to a synchronizer for locating a frame boundary in a serial data stream.

In a typical serial communication system, data is transferred to a data stream receiver in sets of multi-bit frames. The data stream receiver includes a frame synchronizer which locates the frame boundaries and then synchronizes the receipt of information to the frame boundaries. This allows the receiver to accurately extract and process the received data. For example, a "T1" data stream is formed of a set of 193-bit frames. Each frame in the set includes one frame bit and 192 payload bits. The frame bit is located at a particular location in each frame. The payload bits can include encoded voice data, for example. A T1 data stream is transmitted in a selected format, such as Extended Super Frame (ESF) format or Super Frame (SF) format. In ESF format, data is collected in sets of 24 frames and transmitted as a continuous stream. In SF format, data is collected in sets of 12 frames and transmitted as a continuous stream. Of the 24 frame bits per set in the ESF format and the 12 frame bits per set in the SF format, six frame bits are used for frame boundary identification. These frame boundary bits are referred to as "FPS" bits in the ESF format and "Ft" bits in the SF format. The remaining frame bits are used for other purposes, such as data link bits or for Cyclic Redundancy Checks ("CRCs").

The six frame boundary bits together form a predetermined pattern, beginning with the first frame boundary bit of the set. The data stream receiver locates the frame boundary bits, and thus the boundaries between the data frames, by searching the received data stream for the predetermined pattern. A typical data stream receiver considers a number of consecutive frame boundary bits that follow a particular bit position before declaring the bit position as a possible boundary. For example, with a 24-bit qualification, the receiver will search for a bit position from which 24 consecutive frame boundary bits have been found.

In one search method, the received data stream is shifted into a large shift register. The shift register has 24 output taps spaced 193 bits apart. The first tap is typically at the first bit position in the shift register. As each bit is written into the shift register, the bits at the 24 output taps are compared to the search pattern. If there is a match, then the first bit position is a possible candidate for a frame boundary. Once a frame boundary has been located, the receiver can lock onto the received data.

A disadvantage of this method is that it requires an enormous amount of storage space. In order to compare 24 bits, the shift register must store four sets of 24 frames, with 193 bits per frame. This requires a shift register capable of holding 18,528 bits. Also, the search process may end in an incorrect result. Because the received data is random in nature, there may be more than one bit position where 24 consecutive frame boundary bits are found. This method validates the first bit position that it encounters with 24-bit qualification, and does not eliminate mimic or false patterns.

SUMMARY OF THE INVENTION

The data frame synchronizer of the present invention identifies frame boundaries in a serial data stream formed of a set of multi-bit frames. Selected frames in the set have a frame boundary bit at a specified location within the frame, and the frame boundary bits together form a predetermined pattern. The frame synchronizer includes a memory array having a memory data input, a memory data output and a plurality of rows and columns for storing the serial data stream. A memory control circuit is coupled to the memory array for writing successive bits of the serial data stream into the memory array through the memory data input in a sequence such that all of the frame boundary bits align in one of the rows. As each bit is being written into the memory array, the memory control circuit reads the corresponding row through the data output. A pattern detector is coupled to the memory data output for comparing the row with a predetermined pattern.

DETAILED DESCRIPTION OF THE PREFERRED EMBODIMENTS

The data frame synchronizer of the present invention provides an optimal and accurate frame search and synchronizing circuit which takes advantage of the inherent characteristics of the frame pattern and reduces the storage requirements for performing the search. The data frame synchronizer of the present invention also guarantees that the bit position selected at the end of the search is a correct frame boundary.

Figure 1:
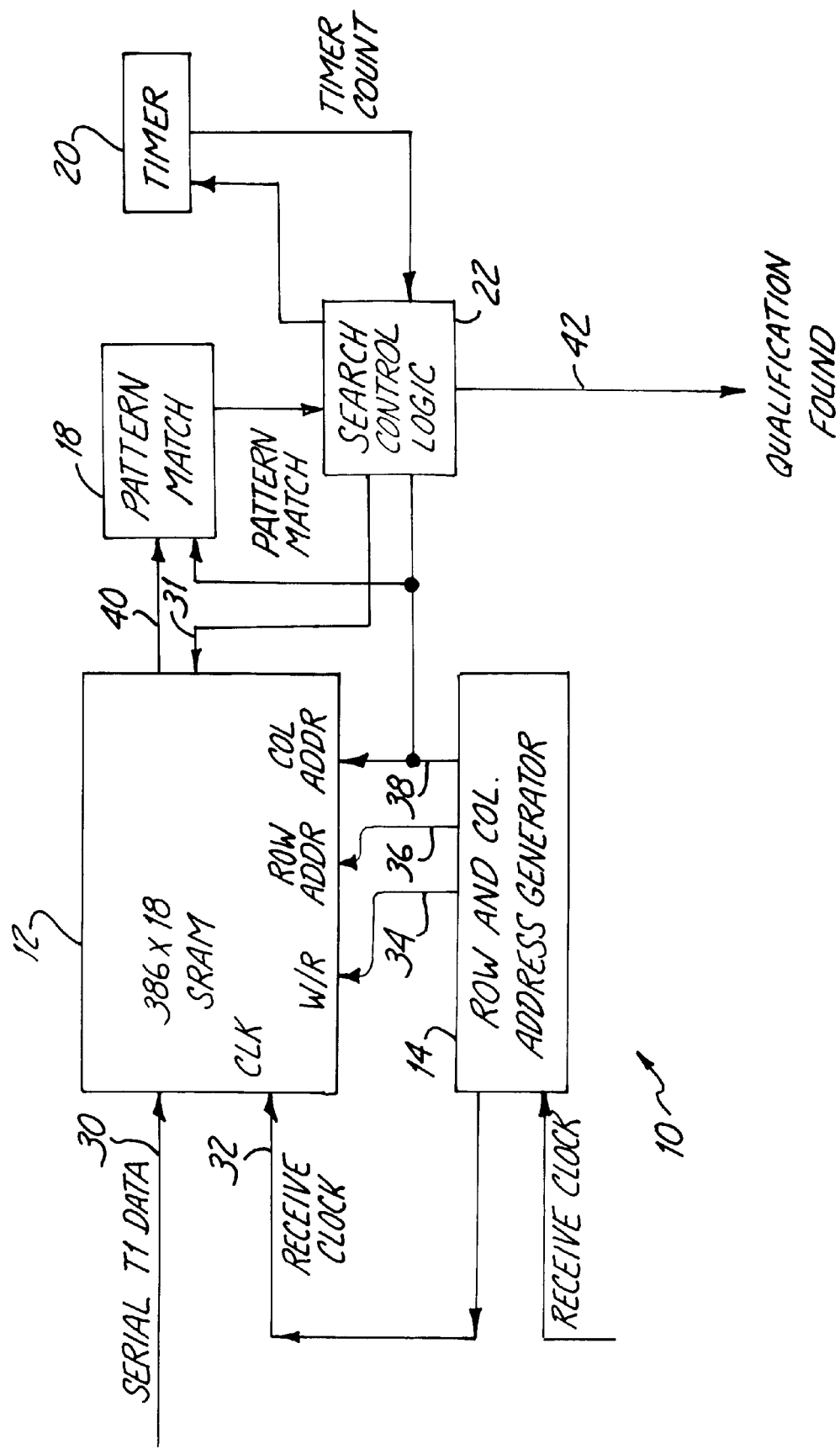
FIG. 1 is a block diagram of a data frame synchronizer circuit according to the present invention.

FIG. 1 is a block diagram of a data frame synchronizer circuit according to the present invention. Data frame synchronizer 10 includes memory array 12, row and column address generator 14, pattern match detector 18, timer 20 and search control logic 22. In one embodiment, memory array 12 includes a synchronous static random access memory (SRAM) having 386 rows and 18 columns. However, memory array 12 can also include a variety of other types of memories, which can be synchronous or asynchronous. Memory array 12 includes data inputs 30 and 31, clock input 32, write/read enable input 34, row address input 36, column address input 38 and data output 40. The serial data stream is received at serial data input 30.

Individual bits within the serial data stream are written into successive bit positions within memory array 12 as a function of a receive clock provided to input 32, a write/read enable signal applied to input 34 and a row and column address applied to inputs 36 and 36. For each cycle of the receive clock, one read and one write of memory array 12 is performed. The receive clock is preferably derived from and synchronized with the serial data stream. When the write/read enable signal is active, the bit received at data input 30 is written in the row and column determined by the row and address applied to inputs 36 and 38 by address generator 14. When write/read enable signal is inactive, the row corresponding to the row address applied to input 36 is presented at data output 40.

Row and column address generator 14 increments the row and column addresses that are applied to inputs 36 and 38 in a sequence such that successive bits of the serial data stream are written into memory array 12 from top to bottom, left to right. In the embodiment shown in FIG. 1, the number of rows in memory array 12 is twice the number of bits in each frame. As a result, adjacent bits in each row are offset from one another by exactly two data frames. If the frame boundary bits are located within every fourth frame, then the frame boundary bits will be stored in the same row at every other column in the row regardless of whether the writing of bits into memory array 12 coincides with a start of a frame boundary.

The first 12 columns of each row in memory array 12 are reserved for storing the serial data stream and form a frame search field. The last six columns in each row are reserved for storing pattern match information, and are divided into a column address field and a pattern match count field. As each received bit is written into a current row and column, the current row is presented at data output 40 and applied to pattern match detector 18. Pattern match detector 18 compares a pattern formed by the bits in every other column in the frame search field, beginning with the current column, to a predetermined frame boundary pattern. Since all potential frame boundary bits are in the same row, these bits are retrieved within a single cycle of the receive clock. If a match is found, search control logic 22 stores the column address of the current column, which is being applied to input 38, in the column address field and stores a count of the number of pattern matches occurring for that row and column in the pattern match count field, through data input 31. If no match is found, search control logic 22 resets the column address field and the match count field of the current row.

Search control logic 22 also monitors the number pattern matches that have been detected for a particular bit position within the frame search field of memory array 12. Once the number of pattern matches reaches a desired value, search control logic 22 initiates timer 20 to start counting the number of receive clock cycles, up to the number of clock cycles required to store one complete set of 24 data frames. Every time a bit position is found with the desired number of pattern matches, timer 20 is reset. As long as more than one bit position exists in memory array 12 having the desired number of pattern matches, timer 20 will not reach the maximum value. The search will end only when a candidate is found with the desired number of pattern matches and timer 20 has reached a count equal to the number of bits in a full set of data frames. This guarantees that the present candidate is the only candidate left, and it is the correct candidate. At that time, search control logic 22 activates output 42, which can be used to synchronize the extraction of data from the received serial data stream.

Figure 2:
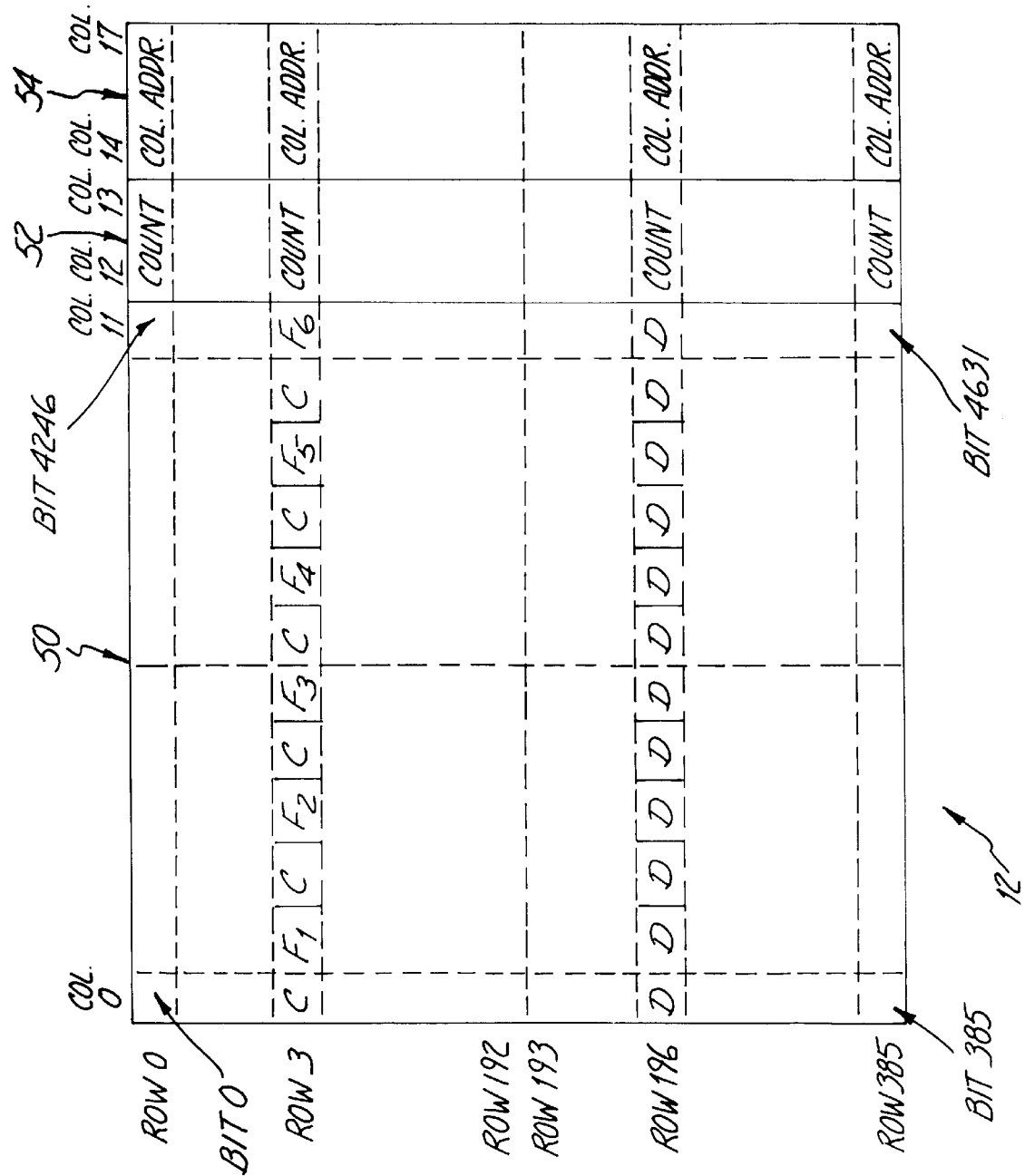
FIG. 2 is a diagram of a memory array within the data frame synchronizer circuit shown in FIG. 3.

FIG. 2 is a diagram which shows the structure of memory array 12 for a "T1" data stream in greater detail. Memory array 12 includes rows 0–385 and columns 0–17. Each row has a frame search field 50 defined by columns 0–11, a pattern match count field 52 defined by columns 12–13 and a column address field 54 defined by columns 14–17. Frame search field 50 stores individual bits from the serial data stream. Pattern match count field 52 stores a number of the pattern matches occurring in a particular column in the row. Column address field 54 stores the column address of the column at which the number of pattern matches occurred.

As mentioned above, successive bits received from the serial data stream are written into memory array 12 from top to bottom, left to right. The positions of bits 0, 385, 4246 and 4631 are labeled at the four corners of frame search field 50. Since there are 193 bits per frame in a T1 data stream and there are 386 rows in each column of memory array 12, adjacent bits in each row are automatically offset by 386 bit positions (two data frames).

In ESF format, data is collected into sets of 24 data frames and then transmitted in a continuous stream. Each data frame has one frame bit and 192 payload bits. Of the 24 frame bits in a set of data frames, six of the frame bits are used for identifying the frame boundaries and the remaining 18 frame bits are used for other purposes, such as data link bits or for a Cyclic Redundancy Check (CRC). The frame boundary bits are located in every fourth data frame. Frame search field 50 of memory array 12 stores one complete set of 24 data frames. Since adjacent bits in each row of memory array are offset by 386 bits, all six of the frame boundary bits in the set of 24 data frames are stored in the same row, at every other bit position in the row, regardless of whether the receive circuitry is synchronized with the frame boundaries.

For example, if the first frame boundary bit $F_1$ of the received serial data stream is written into column 1 of row 3, the subsequent frame boundary bits $F_2$–$F_6$, which are spaced 772 bits apart, will be written in columns 3, 5, 7, 9 and 11 of row 3. The intermediate bits in columns 0, 2, 4, 6, 8 and 10 of row 3 are CRC bits "C". The remaining frame bits of every other data frame are data link bits "D" which are stored in row 196, which is offset from row 3 by one data frame.

After a complete set of data frames has been stored in memory 12, memory 12 is rewritten bit-by-bit with a subsequent set of data frames. The frame boundary bits of the subsequent set of data frames will be written in the same bit positions as the previous frame boundary bits.

Figure 3:
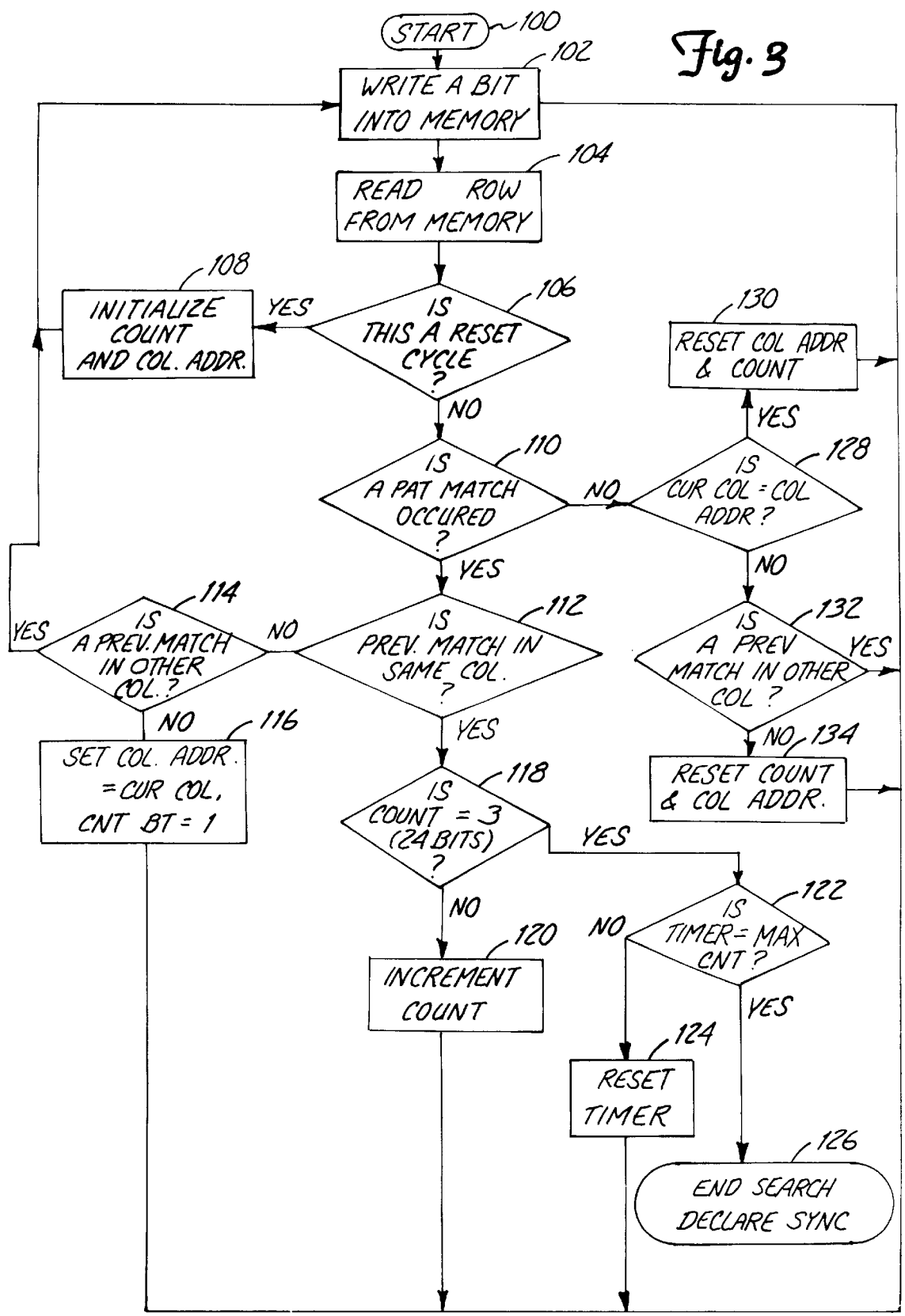
FIG. 3 is a flow chart illustrating a search process performed by the data frame synchronizer circuit shown in FIG. 1.

FIG. 3 is flow chart which illustrates a search process used by frame synchronizer circuit 10 to locate the frame boundary bits in frame search field 50 according to one embodiment of the present invention. The search process starts, at step 100, whenever the receiver circuitry becomes out of sync with the frame boundaries of the received serial data stream.

Each received bit of the serial data stream is written into memory 12, at step 102, in the current row and column determined by row and column address generator 14. As each bit is being written and during the receive clock cycle, the current row is read from memory array 12, at step 104. In one embodiment, the current row is read during the first phase of the receive clock cycle and the received bit is written during the second phase of the receive clock cycle. The received bit is then considered along with the word that was read from the current row.

At step 106, search control logic 22 determines whether the search process is in a reset cycle. In a reset cycle, search control logic 22 initializes memory 12 by filling frame search field 50 with received data before performing any pattern matching. A reset cycle occurs during power-up of the data frame synchronizer or when the receive circuitry becomes out of sync with the frame boundaries. This ensures that the pattern matching is performed on correct data. If the search process is in a reset cycle, search control logic 22 initializes pattern match count field 52 of the current row to zero and initializes column address field 54 to a default address, at step 108. The search process returns to step 102, at which the next received data bit is written into memory 12. This loop continues until the entire memory 12 has been initialized.

If the present cycle is not a reset cycle, the search process proceeds to step 110 where the current row is read from memory 12. Pattern match detector 18 compares the pattern formed by the bits that are stored in every second column of frame field 50, beginning with the current column, to the predetermined frame boundary pattern. For example, if the presently received bit was written into row 3 of column 1, then pattern match detector 18 would compare the pattern formed by bits $F_1$, $F_2$, $F_3$, $F_4$, $F_5$ and $F_6$ in row 3 to the predetermined pattern. If the presently received bit was written into row 3 of column 3, then pattern match detector 18 would compare the pattern formed by bits $F_2$, $F_3$, $F_4$, $F_5$, $F_6$ and $F_1$ on row 3 with the predetermined pattern. If a match occurs, the search process proceeds to step 112.

If column address field 54 does not match the address of the current column (e.g., column 1) then there has not been a previous match in the same column for that row and the process proceeds to step 114. If column address field represents a default address that was written during the reset cycle, then there has not been a previous match in any column in row 3. This is the first column in row 3 having a match. Therefore, count field 52 is incremented from zero to one, and column address field 54 is set to the address of the current column (e.g., column 1) by search control logic 22, at step 116. The search process returns to step 102 for writing another data bit into the next bit position in memory 12.

Referring back to step 114, if the search process was already tracking another column in row 3, then pattern match count field 52 would not be zero and column address 54 would match the address of the other column, as opposed to the address of the current column. Since the desired pattern begins at only one of the columns in row 3, the search process ignores the present match and continues tracking the previous match by returning to step 102.

Referring back to step 112, if pattern match count field 52 is not zero and column address field 54 matches the address of the current column, then there was a previous match in the current column. The search process proceeds to step 118 and search control logic 22 (shown in FIG. 1) determines whether count field 52 is equal to three. If pattern match count field 52 is less than three, controller 16 increments pattern match count field 52 by 1, at step 120, and the search process returns to step 102. If count field 52 is equal to three, at step 118, then this the fourth pattern match for the present bit position. Since each pattern match reflects a comparison of the six frame boundary bits in a set of 24 data frames, four pattern matches reflect a match of 24 consecutive frame boundary bits. This is known as a 24-bit qualification.

The search process does not immediately end the search, because this candidate may be a false or mimic candidate. Upon making four pattern matches, the search process proceeds from step 118 to step 122, and search control logic 22 check whether timer 20 has reached a maximum count ("MAXCNT"), which is equal to the number of bits in one complete set of data frames, to verify that no other bit position within memory 12 has received a 24-bit qualification. Timer 20 is initialized to a value of greater than MAXCNT so that the first time a 24-bit qualification occurs, the timer will be greater than, and thus not equal to, MAXCNT. Search control logic 22 resets timer 20, at step 124, and returns to step 102. When the search process returns to the bit position having four pattern matches, assuming there is still a match, pattern match count field 52 will still equal three since it was not incremented during the last iteration. If there has been no other bit positions in memory 12 having 24-bit qualification, then timer 20 will have a value that exactly equals the maximum count MAXCNT. In ESF format, the maximum count is 4631, and in SF format, the maximum count is 2315. The search process proceeds from step 122 to step 126, where the search is ended and the receive circuitry can be synchronized with the known frame boundaries.

If timer 20 has a value that is less than the maximum count MAXCNT, then there has been another bit position in memory 12 having 24-bit qualification. Timer 20 is again reset at step 124 and the search process returns to step 102 for re-qualification. As long a more than one bit position exists having 24-bit qualification, timer 20 will never reach the maximum count MAXCNT. Since there is only one valid bit position at which the frame boundary pattern begins, the remaining qualified bit positions form false or mimic patterns. The patterns at these remaining bit positions will change with the incoming data and will therefore be eliminated as frame boundary candidates. The search process will end only when a bit position is found with proper qualification and timer 20 has reached exactly the maximum count MAXCNT. This guarantees that the qualified bit position is the only candidate left and it is the correct candidate.

Referring back to step 110, if a pattern match does not occur when the selected bits from the current row are compared with the predetermined pattern, the search process proceeds to step 128. If the address of the current column is equal to column address field 54, then there has been a false previous match beginning with this column. If the previous match were not false, the current column would have also produced a pattern match. Pattern match count field 52 and column address field 54 are reset at step 130, and the search process returns to step 102.

If the address of the current column is not equal to column address field 54, then the search process looks to see whether there has been a previous match in a different column of the current row, at step 132. If so, the search process returns to step 102. If not, pattern match field 52 and column address field 54 are reset at step 134, and the search process returns to step 102.

The writing sequence and the structure of memory array 12 discussed with reference to FIG. 2 can be modified in alternative embodiments as desired or to accommodate different data frame formats. As discussed above, in the ESF format, the frame boundary bits are located in every fourth data frame. In one alternative embodiment, frame search field 50 of memory array 12 has 772 rows and 6 columns. If successive bits are written into memory array 12 top to bottom, left to right, adjacent bits in each row are offset by 772 bits (i.e. four 193-bit data frames). With the ESF format, all six frame boundary bits are written into the same row with no intermediate bits. In another embodiment, frame search field 50 has 193 rows and 24 columns. Adjacent bits in each row are offset from one another by 193 bit positions. With the ESF format, the six frame boundary bits are written into the same row at every fourth bit position in the row.

Conclusion

The data frame synchronizer of the present invention optimizes storage requirements while adding performance to the search process. The synchronizer also guarantees that the bit position that is selected at the end of the search is the correct boundary position of the multi-frame set. The order of writing received data bits is carefully selected such that all frame boundary bits within the set are stored in the same row of the memory. As a result, all frame boundary bits can be read and compared with a predetermined pattern in the same receive clock cycle. A second, faster read clock is not required.

The data frame synchronizer of the present invention searches and tracks all possible bit positions in a set of data frames having the desired frame boundary bit pattern. This parallel search enables the search process to converge on a solution quickly. The search process reduces the storage requirements tremendously as compared to search processes of the prior art since all information about possible boundary positions is stored in the memory instead of in register banks. This also enables the synchronizer to make faster decisions about the current bit position since all information is available as each row is read from the memory.

The data frame synchronizer of the present invention guarantees that when the search ends it has found the correct candidate. It keeps track of and eliminates false candidates or mimic patterns. The synchronizer uses a timer to eliminate false candidates and waits until only one candidate remains. This guarantees that the search process will find the only true candidate.

The data frame synchronizer of the present invention takes advantage of the inherent characteristics of the frame pattern which also speeds the search process and reduces the storage requirements for performing the search. With ESF and SF formats, for example, the data frame synchronizer of the present invention takes advantage of the fact that the six-bit search pattern occurs only once in each set of data frames. The other frame bits are used for other purposes. In the embodiment shown in FIG. 2, only six of the twelve bits in each row can be frame boundary bits. Since the other six bits cannot be frame boundary bits, an additional pattern match count field and column address field are not required to keep track of pattern matches for the other six bits. This exploitation of inherent frame characteristics further minimizes storage requirements.

Although the present invention has been described with reference to preferred embodiments, workers skilled in the art will recognize that changes may be made in form and detail without departing from the spirit and scope of the invention.

What is claimed is:

1. A data frame synchronizer for locating a frame boundary in a serial data stream formed of a set of multi-bit frames, wherein selected frames in the set each have a frame boundary bit at a specified location within the frame and wherein the frame boundary bits of the selected frames together form a predetermined pattern, the data frame synchronizer comprising:

a serial data input for receiving successive bits of the serial data stream;

a memory array comprising a memory data input, a memory data output, and a plurality of memory cells divided into M rows and N columns, wherein the memory data input is coupled to the serial data input, and M and N are integers;

memory control means coupled to the memory array for writing the successive bits of the serial data stream into the memory array through the memory data input such that all the frame boundary bits align in one of the M rows, and for reading the M rows through the data output; and pattern detector means coupled to the memory data output by comparing the M rows with a predetermined frame boundary pattern.

2. The data frame synchronizer of claim 1 and further comprising:

a receive clock input which receives a clock having successive cycles synchronized with the successive bits of the serial data stream;

the memory control means writes each received bit of the serial data stream into a current one of the M rows in a current one of the N columns during a respective cycle of the clock;

the memory control means reads the current row during the respective cycle of the clock; and the memory control means increments the current row for each received bit of the serial data stream and increments the current column after each of the M rows of the current column have been written.

3. The data frame synchronizer of claim 2 wherein each of the M rows comprises:

a frame field for storing the received bits of the serial data stream;

a pattern match count field for indicating a number of previous pattern matches occurring in one of the N columns of the row; and a column address field for indicating address of the column at which the number of previous pattern matches occurred.

4. The data frame synchronizer of claim 3 wherein the pattern detector means comprises:

means for comparing a pattern formed by the bits of the serial data stream that are stored in the current column and selected other columns within the current row to the predetermined frame boundary pattern and identifying whether a current match has occurred; and means for setting the pattern match count field to indicate one match and setting the column address field to an address of the current column if (1) a current match has occurred, (2) there has been no previous pattern matches for the current column and (3) there has been no previous pattern matches for one of the N columns other than the current column, based on the pattern match count field and a comparison of the address of the current column and the column address field.

5. The data frame synchronizer of claim 3 wherein the pattern detector means comprises:

means for comparing a pattern formed by the bits of the serial data stream that are stored in the current column and selected other columns within the current row to the predetermined frame boundary pattern and identifying whether a current match has occurred; and means for resetting the pattern match count field to indicate zero matches and resetting the column address field if a current match has not occurred and (1) there has been at least one previous pattern match for the current column or (2) there has been no previous pattern matches for any of the N columns, based on the pattern match count field and a comparison of the address of the current column and the column address field.

6. The data frame synchronizer of claim 3 wherein the pattern detector means comprises:

means for comparing a pattern formed by the bits of the serial data stream that are stored in the current column and selected other columns within the current row to the predetermined frame boundary pattern and identifying whether a current match has occurred; and means for incrementing the pattern match count field if (1) a current match has occurred, (2) there has been a previous match for the current column and (3) the pattern match count field is less than a predetermined qualification count, based on the pattern match count field and a comparison of the address of the current column and the column address field.

7. The data frame synchronizer of claim 6 wherein:

the serial data stream has a data rate;

the pattern detector means further generates a qualification output each time (1) a current match has occurred, (2) there has been a previous match for the current column and (3) the pattern match count field is equal to the predetermined qualification count; and the data frame synchronizer further comprises timer means coupled to and initiated by the pattern detector means for counting at the data rate a time between successive qualification outputs generated by the pattern detector means.

8. A data frame synchronizer for locating a frame boundary in a serial data stream formed of a set of multi-bit frames, wherein selected frames in the set each have a frame boundary bit at a specified location within the frame and wherein the frame boundary bits of the selected frames together form a predetermined pattern, the data frame synchronizer comprising:

a stream data input for receiving the serial data stream;

a memory array comprising a memory data input, a memory data output, a row address input, a column address input, M rows and N columns, wherein the memory data input is coupled to the serial data input and M and N are integers;

a row and column address generator having a row address output to the coupled row address input, a column address output coupled to the column address input, and an address sequence which increments the row column address outputs through the M rows and N columns as each bit of the serial data stream is written into the memory array;

wherein M and the sequence such that the frame boundary bits align in one of the M rows; and a pattern detector coupled to the memory data output.

9. The data frame synchronizer of claim 8 wherein every Y frames in the set has a frame boundary bit and each frame in the set has X bits, and wherein:

M is an integer multiple of X, with the integer multiple ranging from 1 to Y; and the address sequence increments through the M rows once for each increment of the N columns.

10. The data frame synchronizer of claim 8 wherein every fourth frame in the set has a frame boundary bit and wherein:

M is two times X.

11. The data frame synchronizer of claim 8 and further comprising:

a write clock source having a first clock rate;

a read clock source having the first clock rate; and wherein the memory array has a write enable input coupled to the write clock source and a read enable input coupled to the read clock source.

12. The data frame synchronizer of claim 8 wherein each of the M rows comprises:

a frame search field within in which the serial data stream is stored;

a pattern match count field indicating a number of successive pattern matches occurring in one of the N columns of the row; and a column address field indicating address of the column at which the number of pattern matches occurred.

13. A method of locating a frame boundary in a serial data stream formed of a set of multi-bit frames, wherein selected frames in the set each have a frame boundary bit at a specified location within the frame and wherein the frame boundary bits of the selected frames together form a predetermined pattern, the method comprising:

writing a bit of the serial data stream into a current row and a current column of a memory array having M rows and N columns;

reading the current row;

comparing a pattern formed by selected bits in the current row with the predetermined pattern;

incrementing the current row and the current column in an order such that all frame boundary bits align in one of the M rows; and repeating the steps of writing, reading, comparing and incrementing for each successive bit in the serial data stream.

14. The method of claim 13 and further comprising:

determining whether a current match has occurred based on the comparison of the selected bits and the predetermined frame boundary pattern; and dividing each row into a frame field in which the bits of the serial data stream are stored, a pattern match count field which indicates a number of previous matches occurring in one of the N columns of the row, and a column address field which indicates an address of the column at which the number of previous matches occurred.

15. The method of claim 14 and further comprising:

setting the pattern match count field to indicate one match and setting the column address field to an address of the current column if (1) a current match has occurred, (2) there has been no previous matches for the current column and (3) there has been no previous matches for one of the N columns other than the current column; and performing the steps of incrementing and repeating.

16. The data frame synchronizer of claim 14 and further comprising:

resetting the pattern match count field to indicate zero previous matches and resetting the column address field if a current match has not occurred and (1) there has been at least one previous pattern match for the current column or (2) there has been no previous pattern matches for any of the N columns; and performing the steps of incrementing and repeating.

17. The method of claim 14 and further comprising:

incrementing the pattern match count field if (1) a current match has occurred, (2) there has been a previous match for the current column and (3) the pattern match count field is less than a predetermined qualification count; and performing the steps of incrementing and repeating.

18. The method of claim 17 and further comprising:

generating a qualification output each time (1) a current match has occurred, (2) the column address field is equal to the address of the current column and (3) the pattern match count field is equal to the predetermined qualification count.

19. The method of claim 18 wherein the set of multi-bit frames has Z bits, where Z is an integer, and the method further comprises:

writing successive bits of the serial data stream into the memory array at a data rate;

counting a time at the data rate between the generation of successive qualification outputs; and generating a frame boundary validation output as a function of the time.

* * * * *